(12) United States Patent
Turtinen et al.

(10) Patent No.: US 12,213,183 B2
(45) Date of Patent: Jan. 28, 2025

(54) RECEIVING RANDOM ACCESS RESPONSE WITH EXTENDED RESPONSE WINDOW

(71) Applicant: Nokia Technologies Oy, Espoo (FI)

(72) Inventors: Samuli Turtinen, Ii (FI); Chunli Wu, Beijing (CN); Sami Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/132,546

(22) Filed: Apr. 10, 2023

(65) Prior Publication Data

US 2023/0247679 A1 Aug. 3, 2023

Related U.S. Application Data

(63) Continuation of application No. 17/043,403, filed as application No. PCT/CN2019/075123 on Feb. 14, 2019, now Pat. No. 11,716,764.

(51) Int. Cl.
H04W 74/0833 (2024.01)
H04W 72/23 (2023.01)

(52) U.S. Cl.
CPC ....... *H04W 74/0833* (2013.01); *H04W 72/23* (2023.01)

(58) Field of Classification Search
None
See application file for complete search history.

(56) References Cited

U.S. PATENT DOCUMENTS

| 3,815,456 | A | 6/1974 | Braathen et al. |
| 2009/0201873 | A1 | 8/2009 | Korhonen et al. |
| 2009/0213968 | A1* | 8/2009 | Tormalehto ....... H04W 74/0833 375/343 |
| 2017/0215207 | A1* | 7/2017 | Yi .......................... H04W 28/20 |
| 2017/0238345 | A1 | 8/2017 | Liu et al. |
| 2020/0008240 | A1 | 1/2020 | Golitschek Edler von Elbwart et al. |

(Continued)

FOREIGN PATENT DOCUMENTS

| CN | 101978763 A | 2/2011 |
| CN | 103220811 A | 7/2013 |

(Continued)

OTHER PUBLICATIONS

3rd Generation Partnership Project; Technical Specification Group Radio Access Network; NR; Medium Access Control (MAC) protocol specification (Release 15), 3GPP TS 38.321, V15.4.0, Dec. 2018, pp. 1-77.

(Continued)

*Primary Examiner* — Shripal K Khajuria
(74) *Attorney, Agent, or Firm* — ALSTON & BIRD LLP

(57) ABSTRACT

Method, apparatuses, and computer program product for addressing random access responses with extended response windows. One method may include accessing, by a user equipment, a network by sending a random access channel preamble to a network element. The method may also include receiving, in response to the random access channel preamble, a random access response from the network element. The random access response provides an indication of which random access channel occasion in time within a span of one or a plurality of radio frames the random access response applies.

21 Claims, 4 Drawing Sheets

(56) References Cited

U.S. PATENT DOCUMENTS

| | | | |
|---|---|---|---|
| 2020/0137645 A1* | 4/2020 | Agiwal | H04W 36/0061 |
| 2020/0146054 A1 | 5/2020 | Jeon et al. | |
| 2020/0260497 A1 | 8/2020 | Ozturk et al. | |
| 2023/0247679 A1* | 8/2023 | Turtinen | H04W 72/23 370/329 |

FOREIGN PATENT DOCUMENTS

| | | |
|---|---|---|
| CN | 104519591 A | 4/2015 |
| CN | 106686691 A | 5/2017 |
| CN | 106941730 A | 7/2017 |
| CN | 107223361 A | 9/2017 |
| CN | 107251627 A | 10/2017 |
| EP | 3648539 A1 | 5/2020 |
| EP | 3815456 A1 | 5/2021 |
| EP | 3922051 A1 | 12/2021 |
| WO | WO 2016/023379 A1 | 2/2016 |
| WO | WO 2016/164011 A1 | 10/2016 |
| WO | WO 2017/118197 A1 | 7/2017 |
| WO | WO 2017/131430 A1 | 8/2017 |
| WO | WO 2020/003005 A1 | 1/2020 |
| WO | WO 2020/163184 A1 | 8/2020 |

OTHER PUBLICATIONS

3rd Generation Partnership Project; Technical Specification Group Radio Access Network; NR; Multiplexing and channel coding (Release 15), 3GPP TS 38.212, V15.4.0, Dec. 2018, pp. 1-100.

3rd Generation Partnership Project; Technical Specification Group Radio Access Network; NR; Physical layer procedures for control (Release 15), 3GPP TS 38.213, V15.3.0, Sep. 2018, pp. 1-101.

3rd Generation Partnership Project; Technical Specification Group Radio Access Network; NR; Physical layer procedures for data (Release 15), 3GPP TS 38.214, V15.4.0, Dec. 2018, pp. 1-102.

3rd Generation Partnership Project; Technical Specification Group Radio Access Network; Study on NR-based access to unlicensed spectrum (Release 16), 3GPP TR 38.889, V16.0.0, Dec. 2018, pp. 1-119.

Correction to start of RAR window for NPRACH fmt2 in 36.321, 3GPP TSG-RAN WG2 #104, R2-1816388, Huawei, Nov. 12-16, 2018, 6 pages.

Correction to start of RAR window for NPRACH fmt2 in 36.321, 3GPP TSG-RAN WG2 #104, R2-1818634, Huawei, Nov. 12-16, 2018, 6 pages.

Extended European Search Report received for corresponding European Patent Application No. 19914799.2, dated Oct. 18, 2021, 13 pages.

Final Office Action for U.S. Appl. No. 17/043,403 dated Aug. 29, 2022.

Huawei et al., "Correction to Start of RAR Window for NPRACH fmt2 in 36.321", 3GPP TSG-RAN WG2 #104, CR 1387, R2-1818635, (Nov. 12-16, 2018), 6 pages.

Huawei et al., "Discussion on Random Access for NR-U", 3GPP TSG-RAN WG2 Meeting #AH-1807, R2-1810577, (Jul. 2-6, 2018), 3 pages.

Huawei et al., "Remaining Details of RACH Procedures", 3GPP TSG RAN WG1 Meeting #92, R1-1801331, (Feb. 26-Mar. 2, 2018), 5 pages.

Intel Corporation, "Coverage Improvement for Prach", 3GPP TSG RAN WG1 Meeting #76, R1-140115, (Feb. 10-14, 2014), 9 pages.

Intel Corporation, "Random Access Procedure for NR-u", 3GPP TSG RAN WG2 NR AdHoc #1807, R2-1809788, (Jul. 2-6, 2018), 4 pages.

International Search Report and Written Opinion received for corresponding Patent Cooperation Treaty Application No. PCT/CN2019/075123, dated Oct. 30, 2019, 9 pages.

ITRI, "Random Access Procedure for NR-U", 3GPP TSG-RAN WG2 NR AH1807 Meeting, R2-1810467, (Jul. 2-6, 2018), 2 pages.

LG Electronics Inc., "Clarification of Broadcast Indicator in SIB1", 3GPP TSG-RAN WG2 #103 Meeting, R1-1812802, (Aug. 20-24, 2018), 2 pages.

New WID on NR-based Access to Unlicensed Spectrum, 3GPP TSG RAN Meeting #82, RP-182878, Agenda: 9.1.1, Qualcomm Inc, Dec. 10-13, 2018, 8 pages.

New work item: 2-step RACH for NR, 3GPP TSG RAN Meeting #82, RP-182894, Agenda: 9.1.1, ZTE Corporation, Dec. 10-13, 2018, 5 pages.

Nokia et al., "Remaining Details on RACH Procedure", 3GPP TSG RAN WG1 Meeting RAN1#92, R1-1802022, (Feb. 26-Mar. 2, 2018), 11 pages.

Nokia Networks, "RAR Transmission for MTC", 3GPP TSG-RAN WG1 Meeting #80bis, R1-151312, (Apr. 20-24, 2015), 3 pages.

Non-Final Office Action for U.S. Appl. No. 17/043,403 dated Mar. 16, 2022.

Notice of Allowance for Chinese Application No. 201980016306.7 dated Jan. 13, 2023, 4 pages.

Notice of Allowance for U.S. Appl. No. 17/043,403 dated Apr. 14, 2023.

Notice of Allowance for U.S. Appl. No. 17/043,403 dated Apr. 26, 2023.

Notice of Allowance for U.S. Appl. No. 17/043,403 dated Jan. 11, 2023.

Notice of Allowance for U.S. Appl. No. 17/043,403 dated Jun. 1, 2023.

Office Action for European Application No. 19914799.2 dated May 8, 2023, 10 pages.

Office Action for Indonesian Application No. P00202106247 dated Jun. 14, 2023, 6 pages.

Office action received for corresponding Chinese Patent Application No. 201980016306.7, dated Oct. 27, 2021, 6 pages of office action and No. page of translation available.

Oppo, "Enhancements of 4-Steps RACH in NR-U and the Corresponding TP", 3GPP TSG-RAN WG2 Meeting #104, R2-1816261, (Nov. 12-16, 2018), 4 pages.

Oppo, "Random Access Procedure for NR-U", 3GPP TSG-RAN WG2 Meeting #AH 1807, R2-1809922, (Jul. 2-6, 2018), 3 pages.

Random Access Response Reception in NR-U, 3GPP TSG-RAN2 104, R2- 1816312, Agenda: 11.2.1.1, Samsung, Nov. 12-16, 2018, 2 pages.

Remaining issues on random access for Rel-13 MTC, 3GPP TSG RAN WG1 Meeting #82bis, R1-156565, Agenda: 6.2.1.10, CATT, Nov. 15-22, 2015, pp. 1-3.

ZTE et al., "Remaining Details of RACH Procedure", 3GPP TSG RAN WG1 Meeting #91, R1-1719346, (Nov. 27-Dec. 1, 2017), 30 pages.

ZTE, "Considerations on Channel Access Procedure for NR-U", 3GPP TSG RAN WG2 NR AH1807 Meeting, R2-1809841, (Jul. 2-6, 2018), 3 pages.

ZTE, "Considerations on RAR Window Size for NR-U", 3GPP TSG RAN WG2 NR #104 Meeting, R2-1816832, (Nov. 12-16, 2018), 2 pages.

ZTE, "Further Analysis on Preamble Transmission in NB-IoT", 3GPP TSG-RAN WG2 Meeting #93bis, R2-162360, (Apr. 11-15, 2016), 6 pages.

ZTE, "Random Access Procedure and Messages for NB-IoT", 3GPP TSG-RAN WG2 NB-IoT AH, R2-160530, (Jan. 19-21, 2016), 11 pages.

"3rd Generation Partnership Project; Technical Specification Group Radio Access Network; NR; NR and NG-RAN Overall Description; Stage 2 (Release 15)", 3GPP TS 38.300 v15.4.0, (Dec. 2018), 97 pages.

"3rd Generation Partnership Project; Technical Specification Group Radio Access Network; NR; Radio Resource Control (RRC) protocol specification (Release 15)", 3GPP TS 38.331 v15.4.0, (Dec. 2018), 474 pages.

Office Action for European Application No. 19914799.2 dated Jul. 10, 2024, 9 pages.

Office Action for Chinese Application No. 202310277456.1 dated Sep. 27, 2024, 6 pages.

* cited by examiner

RECEIVING RANDOM ACCESS RESPONSE WITH EXTENDED RESPONSE WINDOW

CROSS-REFERENCE TO RELATED APPLICATIONS

This application is a continuation of U.S. Non-Provisional patent application Ser. No. 17/043,403, filed Sep. 29, 2020 and entitled "Receiving Random Access Response with Extended Response Window," which is a National Phase Entry of International Patent Application No. PCT/CN2019/075123, filed Feb. 14, 2019 and entitled "Receiving Random Access Response with Extended Response Window," the entire disclosures of each of which are hereby incorporated herein by reference in their entireties for all purposes.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for addressing random access responses with extended response windows.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

In accordance with some example embodiments, a method may include sending, by a user equipment, a random access channel preamble to a network element. The method may also include receiving, in response to sending the random access channel preamble, a random access response from the network element. In an example embodiment, the random access response may provide an indication of which random access channel occasion in time within a span of one or a plurality of radio frames the random access response applies.

In accordance with some example embodiments, an apparatus may include means for sending a random access channel preamble to a network element. The apparatus may also include means for receiving, in response to sending the random access channel preamble, a random access response from the network element. In an example embodiment, the random access response may provide an indication of which random access channel occasion in time within a span of one or a plurality of radio frames the random access response applies.

In accordance with some example embodiments, an apparatus may include at least one processor and at least one memory including computer program code. The at least one memory and the computer program code may be configured to, with the at least one processor, cause the apparatus at least to send a random access channel preamble to a network element. The at least one memory and the computer program code may also be configured to, with the at least one processor, cause the apparatus at least to receive, in response to sending the random access channel preamble, a random access response from the network element. In an example embodiment, the random access response may provide an indication of which random access channel occasion in time within a span of one or a plurality of radio frames the random access response applies.

In accordance with some example embodiments, a non-transitory computer readable medium can be encoded with instructions that may, when executed in hardware, perform a method. The method may sending a random access channel preamble to a network element. The method may also receive, in response to sending the random access channel preamble, a random access response from the network element. In an example embodiment, the random access response may provide an indication of which random access channel occasion in time within a span of one or a plurality of radio frames the random access response applies.

In accordance with some example embodiments, a computer program product may perform a method. The method may send a random access channel preamble to a network element. The method may also receive, in response to sending the random access channel preamble, a random access response from the network element. In an example embodiment, the random access response may provide an indication of which random access channel occasion in time within a span of one or a plurality of radio frames the random access response applies.

In accordance with some example embodiments, an apparatus may include circuitry configured to send a random access channel preamble to a network element. The apparatus may also include circuitry configured to receive, in response to sending the random access channel preamble, a random access response from the network element. In an example embodiment, the random access response may provide an indication of which random access channel occasion in time within a span of one or a plurality of radio frames the random access response applies In accordance with some example embodiments, a method may include receiving, at a network element, a random access channel preamble from a user equipment. The method may also include sending, in response to the random access channel preamble, a random access response to the user equipment. In an example embodiment, the random access response may provide an indication of which random access channel occasion in time within a span of one or a plurality of radio frames the random access response applies.

In accordance with some example embodiments, an apparatus may include means for receiving, at a network element, a random access channel preamble from a user equipment. The apparatus may also include means for sending, in response to the random access channel preamble, a random access response to the user equipment. In an example embodiment, the random access response may provide an indication of which random access channel occasion in time within a span of one or a plurality of radio frames the random access response applies.

In accordance with some example embodiments, an apparatus may include at least one processor and at least one memory including computer program code. The at least one memory and the computer program code may be configured to, with the at least one processor, cause the apparatus at least to receive a random access channel preamble from a user equipment. The at least one memory and the computer program code may also be configured to, with the at least one processor, cause the apparatus at least to send, in response to the random access channel preamble, a random access response to the user equipment. In an example embodiment, the random access response may provide an indication of which random access channel occasion in time within a span of one or a plurality of radio frames the random access response applies.

In accordance with some example embodiments, a non-transitory computer readable medium can be encoded with instructions that may, when executed in hardware, perform a method. The method may receive, at a network element, a random access channel preamble from a user equipment. The method may also send, in response to the random access channel preamble, a random access response to the user equipment. In an example embodiment, the random access response may provide an indication of which random access channel occasion in time within a span of one or a plurality of radio frames the random access response applies.

In accordance with some example embodiments, a computer program product may perform a method. The method may receive, at a network element, a random access channel preamble from a user equipment. The method may also send, in response to the random access channel preamble, a random access response to the user equipment. In an example embodiment, the random access response may provide an indication of which random access channel occasion in time within a span of one or a plurality of radio frames the random access response applies.

In accordance with some embodiments, an apparatus may include circuitry configured to receive a random access channel preamble from a user equipment. The apparatus may also include circuitry configured to send, in response to the random access channel preamble, a random access response to the user equipment. In an example embodiment, the random access response may provide an indication of which random access channel occasion in time within a span of one or a plurality of radio frames the random access response applies.

BRIEF DESCRIPTION OF THE DRAWINGS

For proper understanding of the invention, reference should be made to the accompanying drawings, wherein.

DETAILED DESCRIPTION

Figure 1:
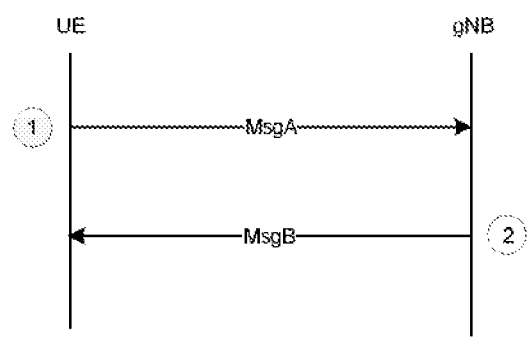
FIG. 1 illustrates an example 2-step random access channel (RACH) signal flow.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for addressing random access responses with extended response window, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may relate to random access (RA) procedures for 3GPP New Radio (NR) design. Other example embodiments may relate to random access response (RAR) reception for NR radio operating in an unlicensed spectrum or MsgB reception for a 2-step random access (RA) procedure.

Certain proposals have been made in 3GPP having a work item on NR-based access to an unlicensed spectrum, as well as on 2-step random access channel (RACH) for NR. For example, for an RA procedure, RA may specify required NR modifications to enhance RACH procedure in line with the agreements during the study phase, including 4-step RACH modifications to handle reduced Msg 1/2/3/4 transmission opportunities due to listen before talk (LBT) failure (radio access network (RAN) 1/RAN2. Further, for RA procedure, LBT for 2-step RACH and application of physical random access channel (PRACH) and physical uplink shared channel (PUSCH) format improvements for NR-U to 2-step RACH may be provided.

For Msg2 in an initial access and mobility, TR 38.889 describes that in some scenarios for Msg2 transmission in the 4-step RACH, it may be beneficial for the maximum RAR window size to be extended beyond 10 ms to improve robustness to downlink (DL) LBT failure for an RAR transmission. Thus, an ra-ResponseWindow may be extended over 10 ms to improve the robustness for RAR transmissions against DL LBT failures blocking the intended transmission.

FIG. 1 illustrates an example 2-step RACH signal flow. In view of the 2-step RACH signal flow in FIG. 1, some outcomes of the 2-step RACH have been captured in the technical report (TR) for the NR-U SI. For example, for 2-step RACH, the msgA may be a signal to detect the user equipment (UE) and a payload while the second message may be for contention resolution for contention based random access (CBRA) with a possible payload. MsgA may at least include the equivalent information which is transmitted in msg3 for 4-step RACH. In addition, further input from RAN1 may be needed for the payload size of msgA.

With the above in mind, as a baseline, all triggers for 4-step RACH may be applicable to 2-step RACH. However, further analysis is needed on a signal information (SI) request and beam failure recovery (BFR), as well as how timing advance and grants may be obtained for msgA. In addition, the contention resolution in the 2-step RACH may be performed by including a UE identifier in the first message which is echoed in the second message. Further, fallback from 2-step RACH to 4-step RACH may be supported. For instance, the fallback after msgA transmission may be feasible only if detection of the UE without the decoding of the payload is possible and, thus, relies on such support at the physical layer. If, however, 2-step RACH is used for the initial access, the parameters for 2-step RACH procedure including resources for msgA may be broadcasted.

The 2-step RACH procedure may include several objectives. One object may specify msgA's content to include the equivalent contents of msg3 of 4-step RACH (RAN2/RAN1). Here, the inclusion of uplink control information (UCI) in msgA is not precluded. Another objective may specify MsgB's content to include the equivalent contents of msg2 and msg4 of 4 step-RACH (RAN1/RAN2). Further objectives may specify contention resolution for 2-step RACH (RAN2), and specify a design of a radio network temporary identifier (RNTI) for MsgB of 2-step RACH (RAN2). In yet another objective, the fallback procedure may be specified from 2-step RACH to 4-step RACH (RAN2/RAN1), and all triggers for Rel-15 NR 4-step RACH may be applied for 2-step RACH except for SI request for BFR, which are up to RAN2 discussion. In all the triggers fro Rel-15 NR 4-step RACH, there are no new triggers from 2-step RACH.

For contention resolution in 2-step RACH, the response may be within the contention resolution timer as in 4-step RACH to leave the network (NW) enough time to process the radio resource control (RRC) message(s). In contention resolution, values of the contention resolution timer (ra-ContentionResolutionTimer) in NR Rel-15 may include: sf8; sf16; sf24; sf32; sf40, sf48, sf56; and sf64. The initial value for the contention resolution timer, sf8, corresponds to 8 subframes, and the value sf16 corresponds to 16 subframes, and so on.

With the subframe always being 1 ms in NR, the maximum value for the timer is therefore 64 ms. Further, random access radio network temporary identifier (RA-RNTI) in NR Rel-15 (TS 38.321) associated with RA preamble transmission is based on the following formula (1).

$$RA\text{-}RNTI = 1 + s\_id + 14 \times t\_id + 14 \times 80 \times f\_id + 14 \times 80 \times 8 \times ul\_carrier\_id \qquad (1)$$

The RA-RNTI associated with the PRACH/RACH occasion in which the RA preamble is transmitted is computed according to the above formula (1). In formula (1), s_id is the index of the first orthogonal frequency division multiplexing (OFDM) symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the uplink (UL) carrier used for Msg1 transmission (0 for normal uplink (NUL) carrier, and 1 for supplementary uplink (SUL) carrier). Hence, the RA-RNTI may be unique only within the span of one radio frame/system frame/system frame number duration, i.e., 10 ms.

In response to a PRACH preamble transmission, a UE may attempt to detect a DCI format 1_0 with cyclic redundancy check (CRC) scrambled by a corresponding RA-RNTI during a RAR window. If the UE detects the DCI format 1_0 with CRC scrambled by the corresponding RA-RNTI and a transport block in a corresponding physical downlink shared channel (PDSCH) within the window, the UE may pass the transport block to higher layers. The higher layers may then parse the transport block from a random access preamble identity (RAPID) associated with the PRACH transmission. If the higher layers identify the RAPID in RAR message(s) of the transport block, the higher layers may indicate an UL grant to the physical layer. Such an indication may be referred to as a random access response (RAR) UL grant.

The DCI for scheduling RAR with RA-RNTI in NR Rel-15 may be defined by information transmitted by means of the DCI format 1_0 with CRC scrambled by RA-RNTI. One such information may include frequency domain resource assignment with $$\left\lceil \log_2\left(N_{RB}^{DL,BWP} \frac{(N_{RB}^{DL,BWP}+1)}{2}\right) \right\rceil \text{ bits.}$$

Here, $N_{RB}^{DL,BWP}$ is the size of CORESET 0 if CORESET 0 is configured for the cell, and $N_{RB}^{DL,BWP}$ is the size of the initial DL bandwidth part if CORESET 0 is not configured with the cell. Further, the time domain resource assignment may be transmitted, which may include 4 bits. In addition, virtual resource block-to-physical resource block (VRB-to-PRB) mapping may be transmitted with 1 bit, the modulation and coding scheme may be transmitted with 5 bits, the TB scaling may be transmitted with 2 bits, and reserved bits may include 16 bits.

The contents of the RAR UL grant, starting with the most significant bit (MSB) and ending with the least significant bit (LSB), may be given in the following table:

TABLE 1

Contents of the RAR UL Grant

| RAR grant field | Number of bits |
| --- | --- |
| Frequency hopping flag | 1 |
| PUSCH frequency resource allocation | 14 |
| PUSCH time resource allocation | 4 |
| MCS | 4 |

TABLE 1-continued

Contents of the RAR UL Grant

| RAR grant field | Number of bits |
|---|---|
| TPC command for PUSCH | 3 |
| CSI request | 1 |

From the above, it can be seen that in the RA-RNTI calculation formula, it is unique only within a duration of system/radio frame that is 10 ms in NR. This means that any RO (RACH occasion) happening at the same time/f_id in subsequent radio frames will have the same RA-RNTI derived by the UEs and used for RAR reception.

However, current formula results already to a maximum of about 18,000 RA-RNTI values (RNTI space being 64 k). Thus, it may be difficult to extend the formula to make ROs in subsequent radio frames unique in terms of RA-RNTI. Specifically, if considering the 2-step MsgB addressed to RA-RNTI with contention resolution timer being, for example, 40 ms, this would already exhaust the RNTI space complete, which is not possible for the system to work. Thus, at most, the RA-RNTI formula may be extended to cover, for example, more frequency domain PRACH allocation than currently available (e.g., 8 PRACH allocations), which would increase the required space more moderately on the other hand, this would also bring issues. However, doing so would not solve the issue with a response window length over 10 ms. Thus, it may be desirable to have an RA-RNTI calculation formula that would not need to be revised to extend over radio frame borders.

According to certain example embodiments, when ra-Response Window for receiving RAR or ra-ContentionResolutionTimer (or any other timer defined for the purpose) for receiving MsgB is configured to be greater than 10 ms, the NW may indicate in the response for which RO in time within a span of one or multiple radio frames, the response applies without extending the RA-RNTI space. In other words, the response may indicate which RO the response applies without extending the RA-RNTI space since different ROs may hence use the same RA-RNTI for scheduling the response. In certain example embodiments, the response may be DCI or RAR/MsgB.

Figure 2:
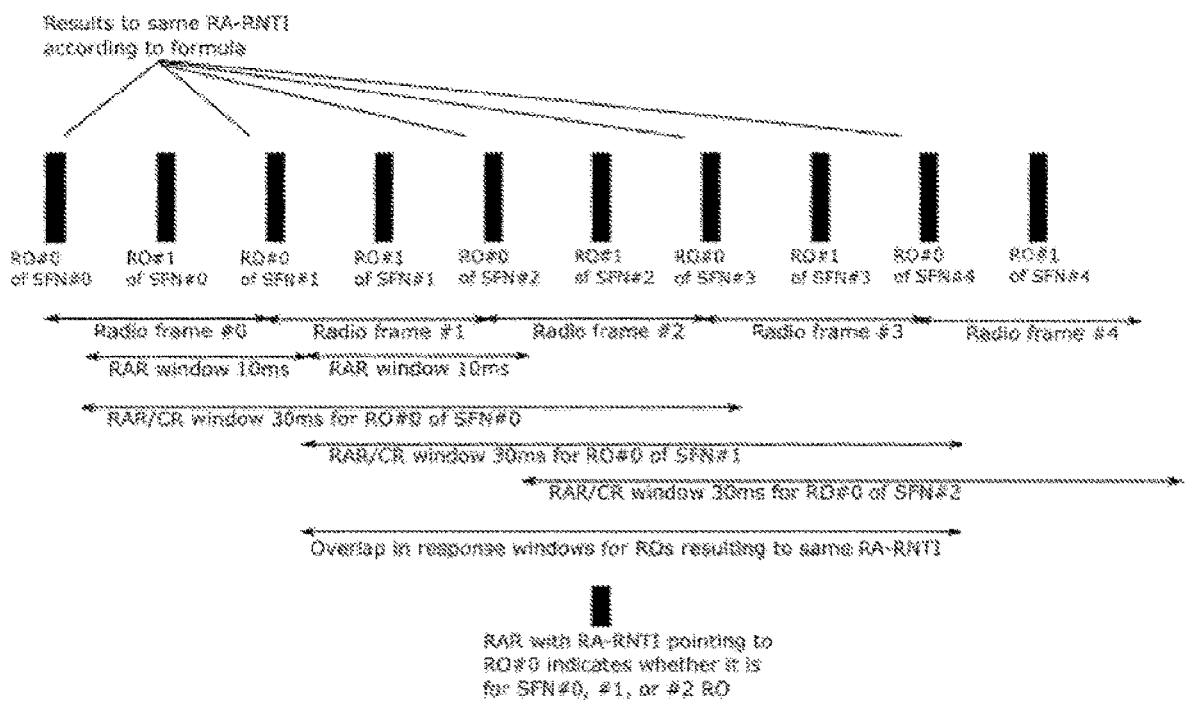
FIG. 2 illustrates possible response timings, according to an example embodiment.

FIG. 2 illustrates possible response timings according to an example embodiment. For example, FIG. 2 illustrates possible response timings which need to indicate to which RO the response applies. As illustrated in FIG. 2, the RAR with RA-RNTI pointing to RO #0 indicates whether it is for system frame number (SFN) #0, #1, or #2 RO.

According to certain example embodiments, the indication about the RO the response applies may be provided via various mechanisms. For example, in one example embodiment, the indication about the RO the response applies may be provided in the DCI scheduling the RAR/MsgB This may utilize the existing reserved bits available in the DCI format In another example embodiment, the indication about the RO the response applies may be provided in the RAR/MsgB message itself and/or the message could consist of multiple indications about multiple ROs. The benefit of this option against providing the indication in the DCI scheduling the RAR/MsgB is that multiple ROs may be responded within a single RAR/MsgB. However, the drawback may be that the UE may have to decode the medium access control (MAC) protocol data unit (PDU) before being able to determine whether the response message corresponds to the RO where it transmitted the preamble. In a further example embodiment, the NW may configure which one of the above mechanisms are used.

In certain example embodiments, the indication in the response provided by the NW may include various contents. For example, in one example embodiment, the indication may include the LSBs of SFN preceding the response message scheduling, or the LSBs of SFN of PRACH resource/RACH occasion (RO) where the preamble was transmitted. For instance, 3 LSBs may allow ROs within 8 radio frames (i.e., 80 ms) to be indicated with the same RA-RNTI. This would also cover the maximum ra-ContentionResolutionTimer value defined in Rel-15.

In another example embodiment, the indication may be just an index offset in radio frames from the radio frame where the response message is scheduled. For instance, an index offset #0 means the current radio frame (i.e., the same radio frame where the response message is scheduled), #1 means the previous radio frame, and so on. Further, the network may configure whether the UE should decode for the indication or alternatively, the UE may determine this based on the ra-Response Window and/or ra-ContentionResolutionTimer lengths configured (i.e., if configured to be greater than 10 ms).

Additionally or alternatively, in another example embodiment, the same RA-RNTI may also be applied in the frequency domain if at a certain point in time, there are more than 8 ROs in the frequency. Here, the DCI scheduling the response message or the response message itself may indicate for which RO in frequency the response applies. This indication may be additional or alternative to the time domain indication.

According to certain example embodiments, the indication may include a one bit indication, which may allow 16 ROs/PRACHs in frequency. This may be done since setting the bit would mean the ROs 8-15 in frequency domain and the actual index in between may be obtained by taking into account the actual f_id used in the RA-RNTI formula. For instance, setting the bit means f_id=8+f_id.

Figure 3:
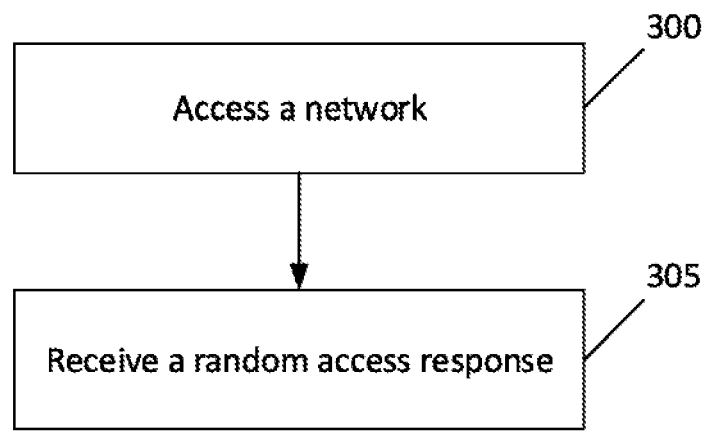
FIG. 3 illustrates an example flow diagram of a method, according to an embodiment.

FIG. 3 illustrates an example flow diagram of a method according to an example embodiment. In certain example embodiments, the flow diagram of FIG. 3 may be performed by a mobile station and/or UE, for instance. According to one embodiment, the method of FIG. 3 may include initially, at 300, accessing a network by sending a random access channel preamble to a network element. The method may also include, at 305, receiving, in response to the random access channel preamble, a random access response from the network element. In an example embodiment, the random access response may provide an indication of which random access channel occasion in time within a span of one or a plurality of radio frames the random access response applies.

Figure 4:
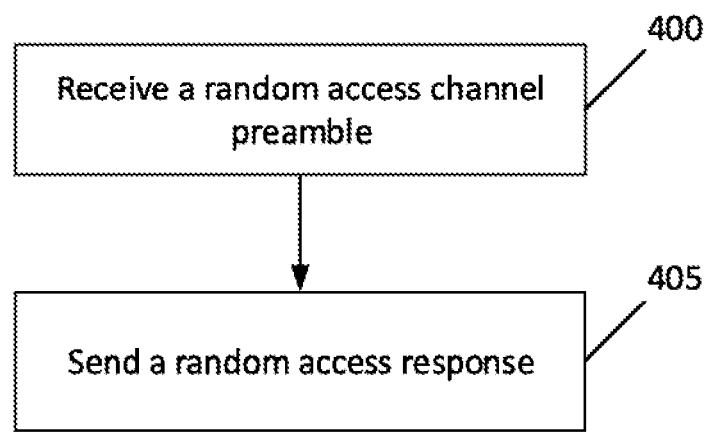
FIG. 4 illustrates an example flow diagram of another method according to an example embodiment.

FIG. 4 illustrates an example flow diagram of another method according to an example embodiment. In certain example embodiments, the flow diagram of FIG. 4 may be performed by a network entity or network node in a 3GPP system, such as LTE or 5G NR. For instance, in some example embodiments, the method of FIG. 4 may be performed by a base station, eNB, or gNB.

According to one example embodiment, the method of FIG. 4 may include initially, at 400, receiving a random access channel preamble from a user equipment. The method may also include, at 405, sending, in response to the random access channel preamble, a random access response to the user equipment. According to an example embodiment, the random access response may provide an indication of which random access channel occasion in time within a span of one or a plurality of radio frames the random access response applies.

In an example embodiment, a window for receiving the random access response may be greater than 10 ms. In another example embodiment, the indication may be provided in a downlink control information scheduling the random access response. In a further example embodiment, the indication may be provided in the random access response itself, and the random access response may include a plurality of indications about a plurality of random access channel occasions. According to another example embodiment, the indication may include a plurality of least significant bits of a system frame number preceding a random access response scheduling, or a plurality of least significant bits of a plurality of a system frame number of a physical random access channel resource. In another example embodiment, the indication may include an index offset in radio frames from a radio frame where the random access response is scheduled. According to a further example embodiment, a same random access radio network temporary identifier may be applied in a frequency domain when there are more than 8 random access channel occasions in frequency.

Figure 5A:
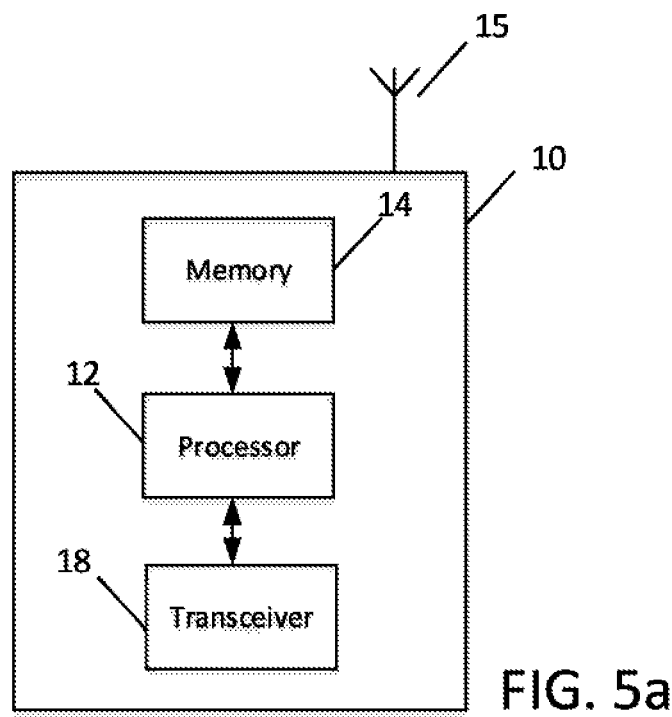
FIG. 5a illustrates a block diagram of an apparatus according to an example embodiment

FIG. 5a illustrates an example of an apparatus 10 according to another embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5a.

As illustrated in the example of FIG. 5a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 28 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 28 may be included in or may form a part of transceiving circuitry.

As discussed above, according to certain example embodiments, apparatus 10 may be a UE, mobile device, mobile station, ME, IoT device and/or NB-IoT device, for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagrams illustrated in FIGS. 1, 2, and 3.

For instance, in one embodiment, apparatus 10 may be controlled by memory 14 and processor 12 to access a network by sending a random access channel preamble to a network element. The apparatus 10 may also be controlled by memory 14 and processor 12 to receive, in response to sending the random access channel preamble, a random access response from the network element. In an example embodiment, the random access response may provide an indication of which random access channel occasion in time within a span of one or a plurality of radio frames the random access response applies.

Figure 5B:
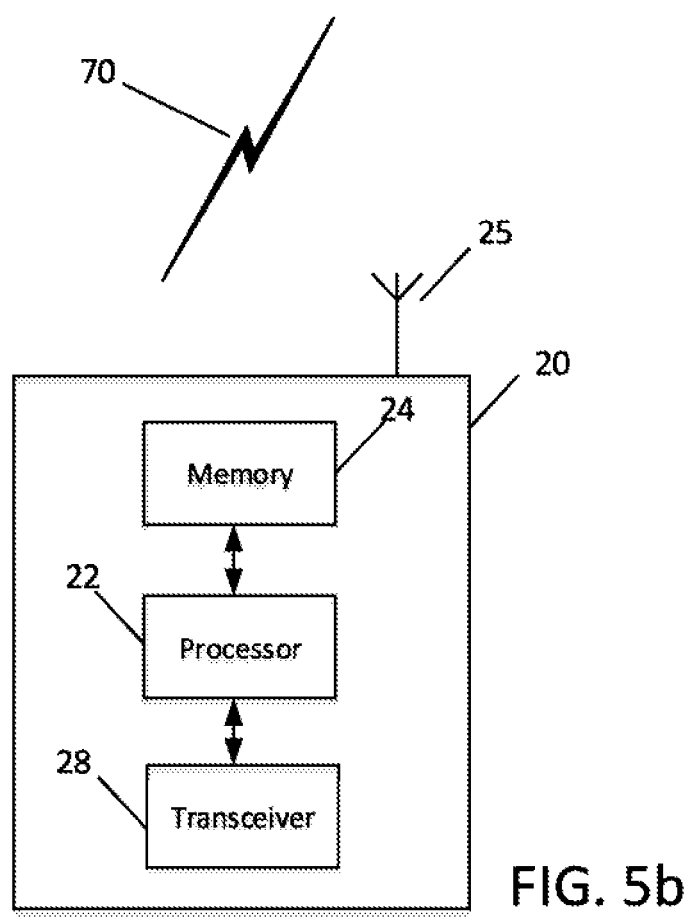
FIG. 5b illustrates a block diagram of another apparatus according to an example embodiment.

FIG. 5b illustrates an example of an apparatus 20 according to an example embodiment. In an example embodiment, apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR In certain example embodiments, apparatus 20 may be an eNB in LTE or gNB in 5G.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 5b.

As illustrated in the example of FIG. 5b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network node or RAN node, such as a base station, access point, Node B, eNB, gNB, WLAN access point, or the like. According to certain embodiments, apparatus 10 may be controlled by memory 24 and processor 22 to perform the functions associated with any of the embodiments described herein, such as the flow or signaling diagrams illustrated in FIGS. 1, 2, and 4.

For instance, in one embodiment, apparatus 20 may be controlled by memory 24 and processor 22 to receiving a random access channel preamble from a user equipment to access a network. The apparatus 20 may also be controlled by memory 24 and processor 22 to send, in response to the random access channel preamble, a random access response to the user equipment. In an example embodiment, the random access response may provide an indication of which random access channel occasion in time within a span of one or a plurality of radio frames the random access response applies.

Certain example embodiments described herein provide several technical improvements, enhancements, and/or advantages. For example, according to certain example embodiments, the RA-RNTI formula as defined in Rel-15 NR may be applied as is. Alternatively, the RA-RNTI formula as defined in Rel-15 NR may at least not need to be extended in the time domain, which can save unnecessary RA-RNTI allocations drastically when extending the RA response window length or introducing a long contention resolution window for MsgB.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| DCI | Downlink Control Information |
| eNB | Enhanced Node B (LTE base station) |
| gNB | 5G or NR Base Station |
| LBT | Listen Before Talk |
| LSB | Least Significant Bits |
| LTE | Long Term Evolution |
| MU | Multi-User |
| NW | Network |
| NR | New Radio |
| NR-U | New Radio Unlicensed |
| PRACH | Physical Random Access Channel |
| PRB | Physical Resource Block |
| RA | Random Access |
| RACH | Random Access Channel |
| RAR | Random Access Response |
| RNTI | Radio Network Temporary Identifier |
| RO | RACH Occasion |
| SFN | System Frame Number |
| UE | User Equipment |
| UL | Uplink |

The invention claimed is:

1. A method comprising:
sending, by a user equipment, to a network element, a transmission comprising a random access channel preamble;
receiving, by the user equipment and from the network element, in response to sending the transmission comprising the random access channel preamble, downlink control information for scheduling a random access response associated with the transmission; and
determining, by the user equipment, in an instance in which a window for receiving the random access response is configured to be greater than 10 ms, to decode for an indication in the downlink control information,
wherein the indication indicates a random access channel occasion to which the random access response applies, and
wherein the indication comprises a plurality of least significant bits of a system frame number corresponding to the random access channel occasion where the random access channel preamble was transmitted.

2. The method of claim 1, wherein the random access response is comprised in an msg2 in a four-step random access procedure, or comprised in an MsgB in a two-step random access procedure.

3. The method of claim 1, wherein the indication indicates the random access channel occasion in time, within a span of one radio frame or a plurality of radio frames.

4. A user equipment comprising:
at least one processor; and
at least one memory storing instructions thereon that, when executed by the at least one processor, cause the user equipment to perform at least:
sending a transmission comprising a random access channel preamble to a network element;
receiving, from the network element, in response to sending the transmission comprising the random access channel preamble, a downlink control information for scheduling a random access response associated with the transmission; and
determining, in an instance in which a window for receiving the random access response is configured to be greater than 10 ms, to decode for an indication in the downlink control information,
wherein the indication indicates a random access channel occasion to which the random access response applies, and
wherein the indication comprises a plurality of least significant bits of a system frame number corresponding to the random access channel occasion where the random access channel preamble was transmitted.

5. The user equipment of claim 4, wherein the random access response is comprised in an msg2 in a four-step random access procedure, or comprised in an MsgB in a two-step random access procedure.

6. The user equipment of claim 4, wherein the indication indicates the random access channel occasion in time, within a span of one radio frame or a plurality of radio frames.

7. A method comprising:
receiving, at a network element, a transmission comprising a random access channel preamble from a user equipment; and
sending, by the network element, to the user equipment, in response to receiving the transmission comprising the random access channel preamble, a downlink control information for scheduling the random access response associated with the transmission,
wherein, in an instance in which a window for receiving the random access response is configured to be greater than 10 ms, a length of the window indicates to the user equipment to decode for an indication in the downlink control information,
wherein the indication indicates a random access channel occasion to which the random access response applies, and
wherein the indication comprises a plurality of least significant bits of a system frame number corresponding to the random access channel occasion where the random access channel preamble was transmitted.

8. The method of claim 7, wherein the random access response is comprised in an msg2 in a four-step random access procedure, or comprised in an MsgB in a two-step random access procedure.

9. The method of claim 7, wherein the indication indicates the random access channel occasion in time, within a span of one radio frame or a plurality of radio frames.

10. The method of claim 7, further comprising:
configuring a length of the window for receiving the random access response.

11. A network element comprising:
at least one processor; and
at least one memory storing instructions thereon that, when executed by the at least one processor, cause the network element to perform at least:
receiving, from a user equipment, a transmission comprising a random access channel preamble; and
sending, to the user equipment, in response to the transmission comprising the random access channel preamble, a downlink control information for scheduling the random access response associated with the transmission, wherein, in an instance in which a window for receiving the random access response is configured to be greater than 10 ms, a length of the window indicates to the user equipment to decode for an indication in the downlink control information, wherein the downlink control information comprises an indication which indicates a random access channel occasion to which the random access response applies, and wherein the indication comprises a plurality of least significant bits of a system frame number corresponding to the random access channel occasion where the random access channel preamble was transmitted.

12. The network element of claim 11, wherein the random access response is comprised in an msg2 in a four-step random access procedure, or comprised in an MsgB in a two-step random access procedure.

13. The network element of claim 11, wherein the indication indicates the random access channel occasion in time, within a span of one radio frame or a plurality of radio frames.

14. The network element of claim 11, wherein the instructions stored on the at least one memory, when executed by the at least one processor, further cause the network element to perform at least:
configuring a length of the window for receiving the random access response at the user equipment.

15. A non-transitory computer readable storage medium comprising instructions stored thereon that, when executed by at least one processor of a user equipment, cause the user equipment to perform at least:
sending, to a network element, a transmission comprising a random access channel preamble;
receiving, from the network element, in response to sending the transmission comprising the random access channel preamble, downlink control information for scheduling a random access response associated with the transmission; and
determining, in an instance in which a window for receiving the random access response is configured to be greater than 10 ms, to decode for an indication in the downlink control information,
wherein the indication indicates a random access channel occasion to which the random access response applies, and
wherein the indication comprises a plurality of least significant bits of a system frame number corresponding to the random access channel occasion where the random access channel preamble was transmitted.

16. The non-transitory computer readable storage medium of claim 15, wherein the random access response is comprised in an msg2 in a four-step random access procedure, or comprised in an MsgB in a two-step random access procedure.

17. The non-transitory computer readable storage medium of claim 15, wherein the indication indicates the random access channel occasion in time, within a span of one radio frame or a plurality of radio frames.

18. A non-transitory computer readable storage medium comprising instructions stored thereon that, when executed by at least one processor of a network element, cause the network element to perform at least:
receiving, from a user equipment, a transmission comprising a random access channel preamble; and
sending, to the user equipment, in response to the transmission comprising the random access channel preamble, a downlink control information for scheduling the random access response associated with the transmission,
wherein, in an instance in which a window for receiving the random access response is configured to be greater than 10 ms, a length of the window indicates to the user equipment to decode for an indication in the downlink control information,
wherein the indication indicates a random access channel occasion to which the random access response applies, and
wherein the indication comprises a plurality of least significant bits of a system frame number corresponding to the random access channel occasion where the random access channel preamble was transmitted.

19. The non-transitory computer readable storage medium of claim 18, wherein the random access response is comprised in an msg2 in a four-step random access procedure, or comprised in an MsgB in a two-step random access procedure.

20. The non-transitory computer readable storage medium of claim 18, wherein the indication indicates the random access channel occasion in time, within a span of one radio frame or a plurality of radio frames.

21. The non-transitory computer readable storage medium of claim 18, wherein the instructions stored thereon, when executed by the at least one processor of the network element, further cause the network element to perform at least:
configuring a length of the window for receiving the random access response.

* * * * *